United States Patent [19]

Baran

[11] 4,438,511
[45] Mar. 20, 1984

[54] PACKETIZED ENSEMBLE MODEM

[75] Inventor: Paul Baran, Menlo Park, Calif.

[73] Assignee: Telebit Corporation, Cupertino, Calif.

[21] Appl. No.: 205,744

[22] Filed: Nov. 10, 1980

[51] Int. Cl.$^3$ .......................... H04J 11/00; H04J 4/00
[52] U.S. Cl. ........................................ 370/19; 370/60; 370/94; 370/16; 370/50
[58] Field of Search .................... 370/18, 70, 13, 16, 370/17, 19, 94, 60, 50

[56] References Cited

U.S. PATENT DOCUMENTS 3,706,929 12/1972 Robinson .......................... 179/1 SA
3,875,394 4/1975 Shapely et al. ........................ 370/19
4,206,320 6/1980 Keasler et al. ........................ 370/19

OTHER PUBLICATIONS

Product Brochure for Gandalf SM9600 Super Modem, Gandalf Data, Inc.
"Digital Super Modem: Why and How It Was Developed", *Data Communications*, Jun. 1980, pp. 87–95, Hick.
Product Brochure for AT&T 2096A, 9600 bps, Dataphone II.

*Primary Examiner*—Gerald L. Brigance
*Attorney, Agent, or Firm*—Townsend and Townsend

[57] ABSTRACT

A high speed digital data modem particularly suited for use on a dial up telephone line is disclosed. For the transmit ensemble, the telephone passband is divided into sixty-four sub-bands each with a carrier located approximately in the center of each sub-band. Each carrier is amplitude and phase modulated in order to encode five (5) bits. One carrier is used as a reference signal for phase and amplitude. The modulated carriers can be changed in data content every epoch. By use of packetization of data, individual amplitude correction, and individual phase correction for each carrier, the high speed modem may achieve up to 12000 bps over a dial up line with a simultaneous 300 bps reverse channel.

10 Claims, 14 Drawing Figures

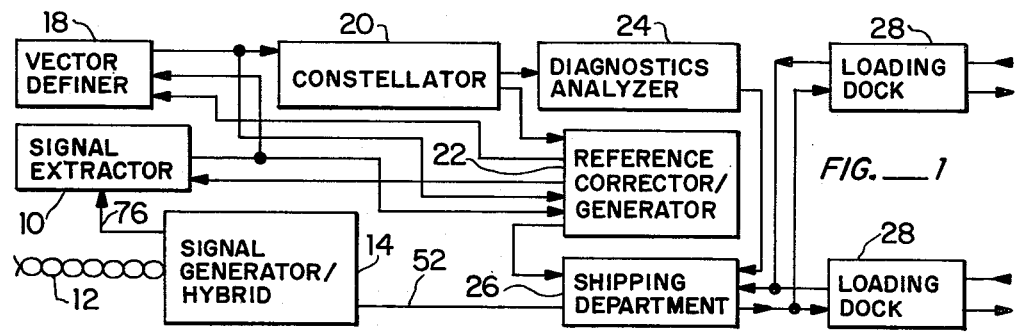
FIG._1
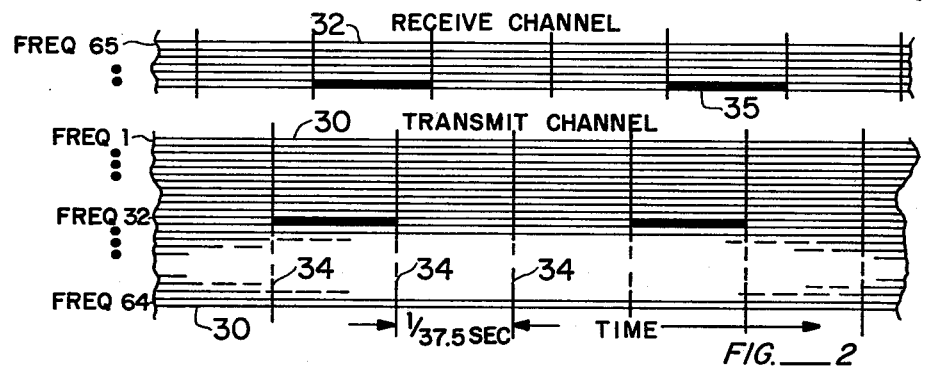
FIG._2
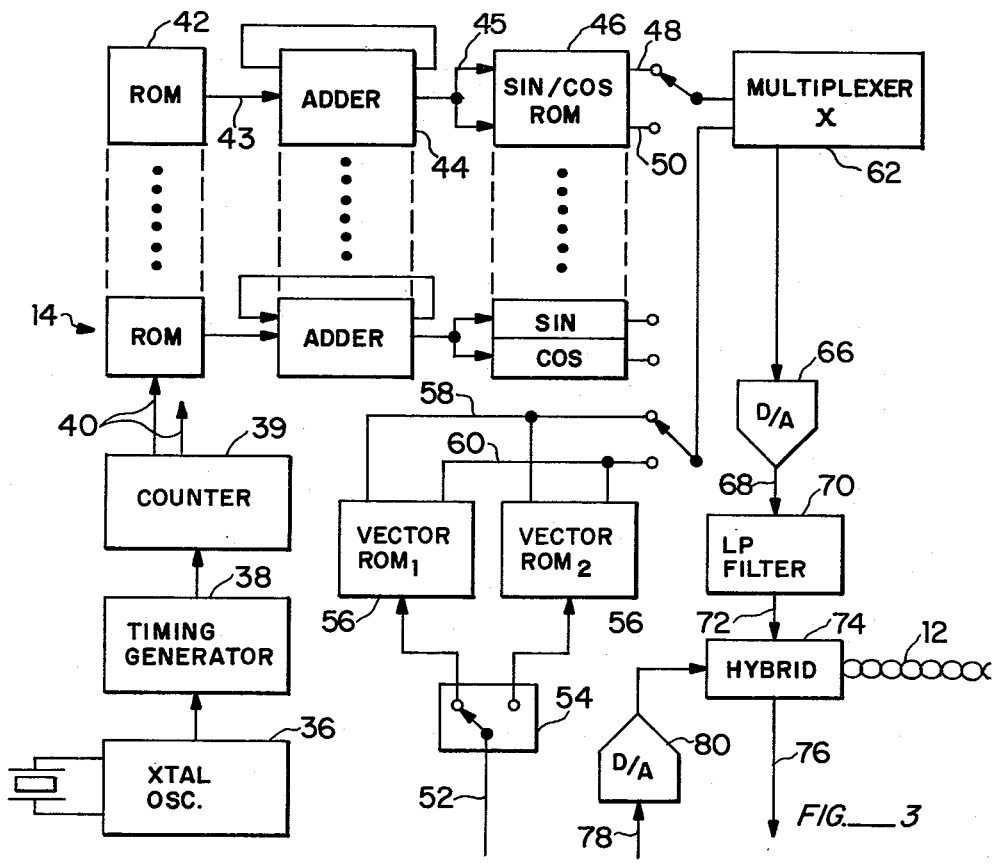
FIG._3

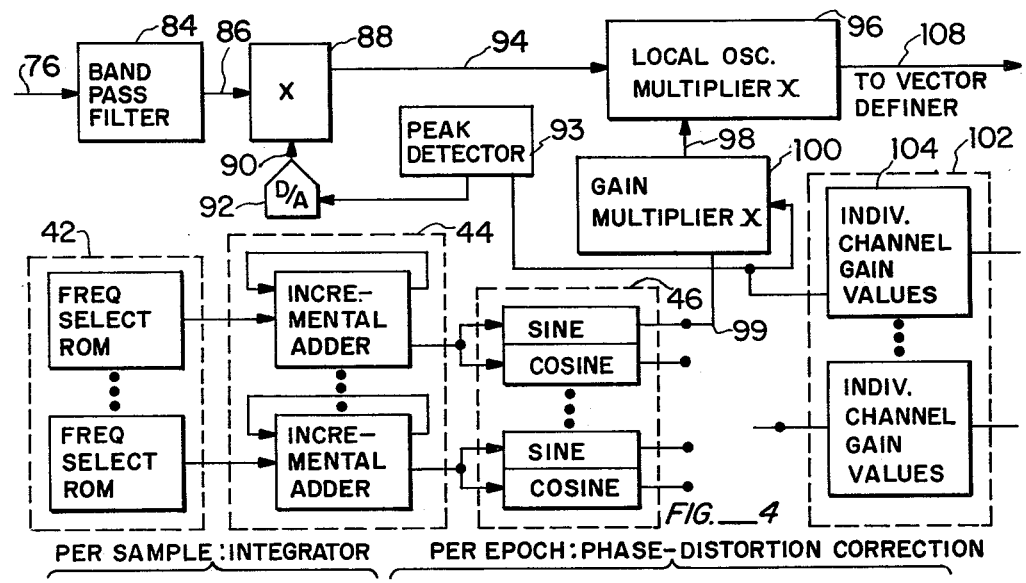
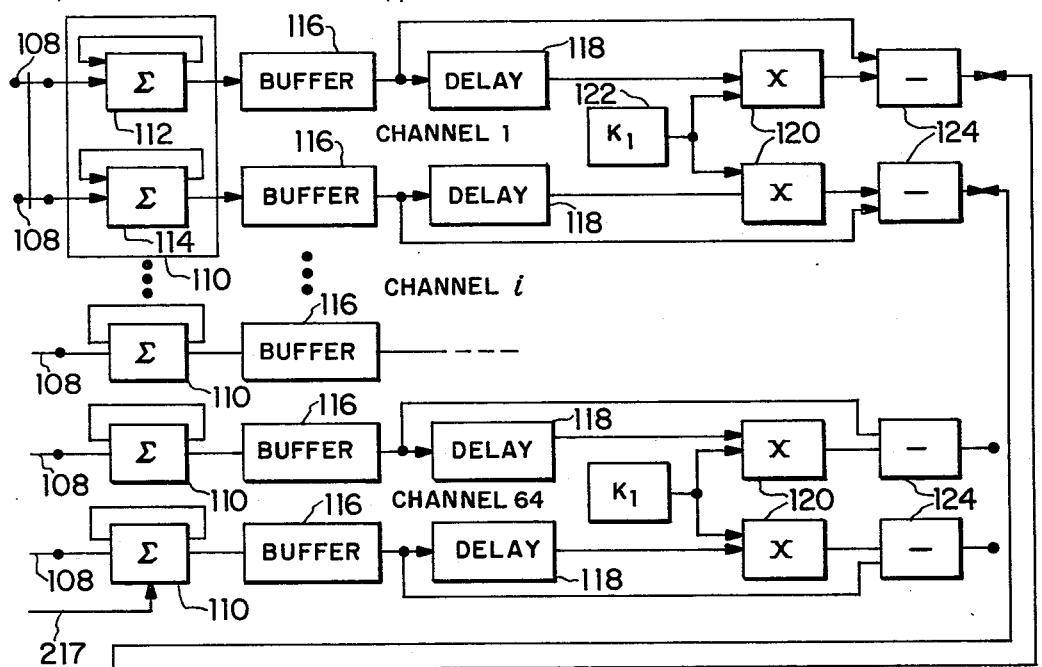
FIG._4
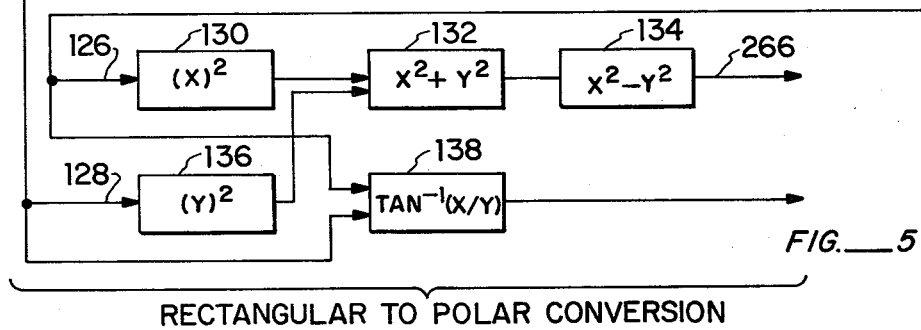
FIG._5
RECTANGULAR TO POLAR CONVERSION

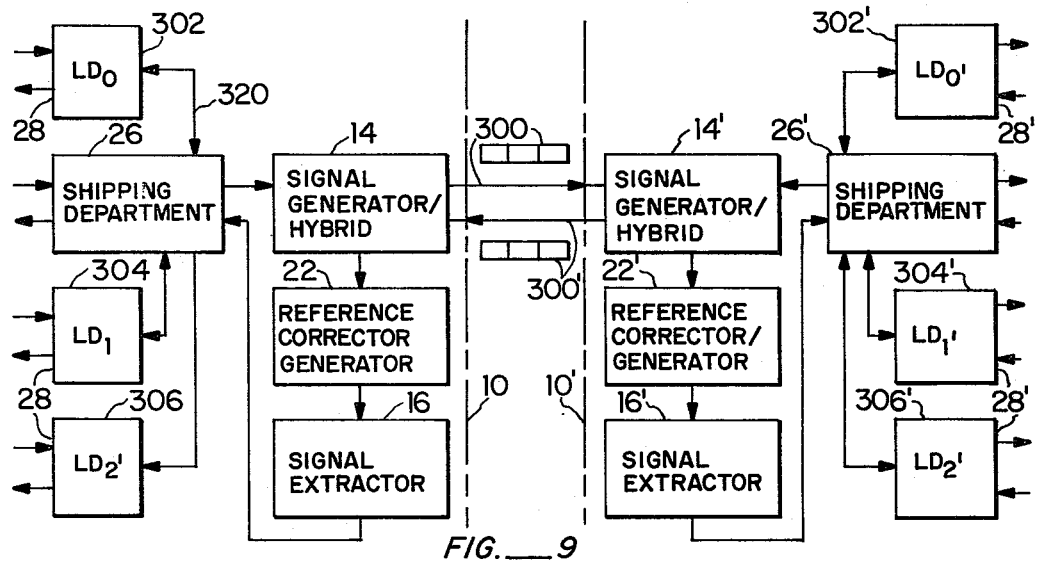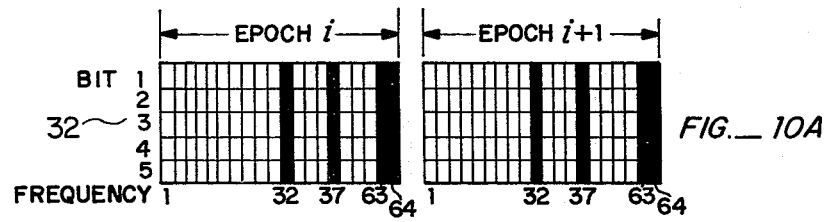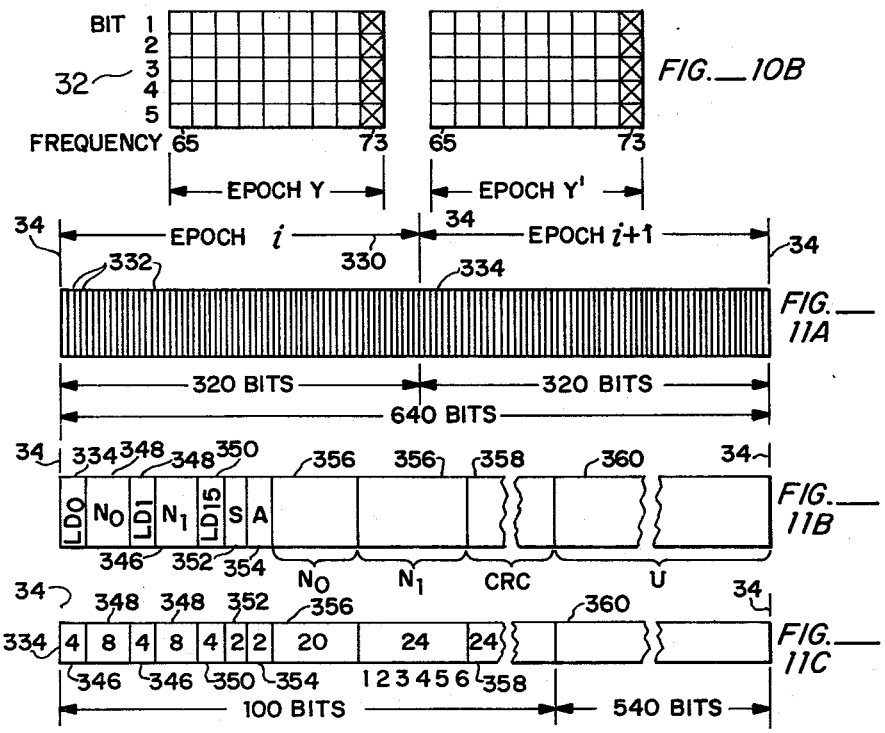

PACKETIZED ENSEMBLE MODEM

BACKGROUND OF THE INVENTION

1. Field of the Invention

The invention relates to the field of data communications and finds particular application as a high speed, full duplex, modem.

2. Description of the Prior Art

While at one time telephone lines only carried voice communications, for many years now it has been common for digital data to be conveyed over the telephone network. However, this development has not been without significant technical limitations and obstacles. For example, the bandwidth of a typical "dial up" telephone line is only approximately 3 kilohertz (kHz) which serves as an upper limit to the data transfer rate upon the line. Further, impairments or performance limitations of the dial up telephone network have severely limited the ability of the network to reliably transfer digital data at high speeds. For example:

Telephone lines suffer from frequency distortion or attenuation of the high and low frequencies across the available 3 kHz bandwidth.

There is commonly phase distortion or a difference in the time delay for each frequency component across the available 3 kHz bandwidth.

Frequently a hetrodyne offset may be encountered which shifts the received component frequencies with respect to the transmitted component frequencies; this results from frequency variations between the telephone company's hetrodyne oscillators.

Amplitude distortion is common and often caused by non-linear amplification of the telephone company's A/D converters.

Impulse noise is common and often results from line "hits" (i.e. lightning) or dial "clicks" from other telephone circuits.

Cross-talk is not a rare occurrence; cross-talk is the "leaking" of voices or tones from one line to another.

Phase jumps (i.e. the instantaneous changes of time delay or phase) of the carrier are common.

Amplitude jumps (i.e. instantaneous changes in amplitude generally as a result of alternate microwave link switch overs) are all too common.

Gaussian noise is an ever present impairment that plagues all electrical systems.

Echo suppressors are installed by the telephone company to permit very long distance voice communication, but they must be disabled for long distance data two way communication.

Typically, high speed modems have suffered from one hybrid loss or the undesired return of a portion of the transmitted signal into the local receiver channel.

Echo on telephone lines is the typical occurrence of return of the transmitted signal back into the receiver channel usually on long distance communications.

Satellite delay is a further line impairment caused by the delay encountered by the distances travelled by telephone signals when beamed to geostable earth satellites.

In addition to the foregoing, several other factors must be kept in mind when considering digital data telecommunications at, say, 9600 bits per second (bps). First, achieving *reliable* 9600 bps over a dial up line is virtually unheard of. To obtain *reliable* 9600 bps communication over a telephone line, conditioning is often a necessity; a conditioned line is one of which the user pays a premium and is assured by the telephone company that the line is of lower (or customized) noise characteristics. Conditioning is tailored to the high speed modem manufacturer's specifications, and conditioning cannot obviously be obtained for a dial up line (that would mean conditioning *all* lines). Second, 9600 bps full duplex operation can only be obtained with modems of the prior art when utilizing two lines (i.e. four wires), certainly not on a single channel and never on dial up lines. Third, modems of the prior art which do manage to achieve 9600 bps on conditioned lines do not gracefully degrade their performance in the presence of impairments. That is, a conditioned line does not guarantee zero impairments; it only statistically reduces the probability of impairments. Yet, when 9600 bps modems of the prior art encounter noise, as they inevitably will, they typically reduce the transmitted data rate to 7200 bps, 4800 bps, 2400 bps, 1200 bps, and so on until reliable communication is re-established. Often, though, impairments of the telephone line are limited to particular frequency bandwidths, and thus, reducing the net data transmission rate usually by a factor of two or four is a needless and uneconomic waste of the available telephone bandwidth.

One high speed digital modem of the prior art is the SM9600 Super Modem manufactured by Gandalf Data, Inc. The SM9600 is nominally a full duplex, 9600 bps modem which can operate over a dial up line. However, the SM9600 data sheets recommend conditioning of the line. In the presence of impairments, the SM9600 will "gearshift" or drop back its transmitted data rate to 4800 bps or 2400 bps. Further, the SM9600 cannot operate full duplex at 9600 bps over a single channel but must allocate a portion of the available spectrum for a reverse channel if a single channel is all that is aviable or utilize a second line (i.e., a total of four wires) for full duplex operation. Further, still, the SM9600 cannot cope with single or multiple extraneous tones within the passband.

The most common class of 9600 bps digital data modems of the prior art is available from AT&T (Model 2096A). This class of modem is extremely sensitive to impulse noise (i.e., dial clicks and lightning strikes). It will tolerate but 5 Hz frequency heterodyne offset, and it requires use of a conditioned line for 9600 bps. Further, this class of modem is extremely sensitive to cross-talk, and the unit does not have any capability for error suppression.

U.S. Pat. No. 3,706,929 to Robinson et al. discloses a combined modem and vocorder pipeline processor. In Robinson, the modem function is implemented using 16 frequency division multiplexed channels, data being carried on each channel by means of phase shift keyed modulation of each carrier. Robinson, however, requires a four wire circuit or a completely separate line for the reverse channel in order to achieve full duplex operation, and conditioning of the line is a necessity to achieve high data rates.

U.S. Pat. No. 4,206,320 to Keasler et al. discloses a high speed modem suitable for operating with a switched network. However, Keasler requires a completely separate reverse channel to obtain full duplex operation. Further, while utilizing 32 carriers to convey the information in a frequency division multiplexed manner, Keasler employs the inefficient mechanism of forming a "hole" or delay at the beginning and end of each modulation sub-period in order to minimize the effects of intersymbol distortion. The shortened modulation period can cause undesired crosstalk between adjacent channels.

Several other aspects tend to render all high speed digital data modems of the prior art, including those referenced hereinabove, obsolete. No modems of the prior art are capable of functioning in both synchronous and asynchronous modes. Synchronous transmission is the old standard form of data communication over a telephone line. However, asynchronous transmission in the form of packetization vastly improves the error performance of the modem. In packet transmission data is formed into blocks (say, from 0 to 256 characters each) which are sent as self contained packets. Each packet contains housekeeping information for framing, routing, error detection, etc. This housekeeping information is placed into packet header and trailing fields. During the last few years there has been an unprecedented, rapid adoption of an international standard for packet switched communication—International Standards Organization X.25. X.25 is a multilevel protocol with only the lower levels which deal with the transmission of the data itself now unambiguously defined. There is a major advantage in having a high speed modem that is capable of X.25 protocol compatibility for obvious internet communication. There is a further significant advantage in having a modem that can communicate over internets utilizing protocols *other than* X.25 (each computer company devised its own protocol prior to X.25). There are simply *no* high speed digital data modems of the prior art which are compatibile with packet switched networks (not to mention any that are compatible with *multiple* packet switching internet protocols) and which operate in *both* synchronous and asynchonous modes concurrently through signal multiplexing.

In addition to the foregoing, modems of the prior art suffer from the inability to isolate or otherwise pinpoint the source of poor error performance to either the modem or the communication medium. High speed modems of the prior art commonly calculate a composite data error rate which aggregates causes originating in the modem itself and the causes originating from the telephone circuit. Often the most vexing problem to the data communication manager is assigning blame correctly for poor communication performance so that the problem can be fixed. It is usual for the telephone company to immediately deny that any transient fault is due to its equipment. By their nature, transient faults tend to disappear in time and later gross measurements often in fact find nothing wrong with the telephone circuit. Further, even if the circuit impairment persists, measurements made by the telephone company are often incomplete with respect to the range of possible impairments. There are simply *no* modems of the prior art which can separate modem performance errors from telephone circuit impairments. Moreover, there are simply *no* modems of the prior art which permit the modem user to completely characterize the telephone circuit so that the user can adequately direct repairs to the telephone circuit by the telephone company.

SUMMARY OF THE INVENTION

It is thus an object of the present invention to provide a digital high speed data modem that can operate in full duplex mode on a dial up telephone line at data rates in excess of 9600 bps.

It is another object of the present invention to provide a digital high speed data modem that can operate in the synchronous, aynschronous, and packet modes.

It is yet another object of the present invention to provide a digital high speed data modem that can operate on telephone lines exhibiting higher phase error and frequency attenuation roll-off than permitted by modems of the prior art.

It is another object of the present invention to provide a digital high speed data modem that can operate in full duplex mode in excess of 9600 bps on a dial up telephone line and which can be manufactured at a lower cost to performance ratio compared with that of prior art modems.

It is yet another object of the present invention to provide a digital high speed data modem that can operate with multiple higher level protocols as commonly used with packet switched networks.

It is another object of the present invention to provide a digital high speed data modem which reduces its transmitted data rate in small increments in response to telephone line impairments.

It is yet another object of the present invention to provide a digital high speed data modem which exhibits significantly lower error rates than modems of the prior art while operating at 9600 bps.

It is yet another object of the present invention to allow flexibility of data input format and the intermixing of a multiplicity of sources of asynchronous, synchronous, and packet format data in an essentially error-free manner.

It is yet another object of the present invention to permit local or remote diagnostics to be performed in an unambiguous manner in order to pinpoint errors by characterizing the channel's noise, frequency attenuation, phase shift, and frequency offset solely in terms of the corruption by the transmission medium and not as an artifact of the modem's data characteristics.

It is yet another object of the present invention to determine whether the telephone line or the modem is at fault when errors occur and to unambiguously inform a remote site as to the specifics of the problems in measured quantitative terms with both data and voice backup.

In a preferred embodiment of the present invention, an ensemble of sixty-four (64) orthogonally modulated carriers is digitally generated. Each such carrier or tone is individually modulated to contain five (5) bits. One (1) carrier within the ensemble of sixty-four (64) serves as a pilot tone for precise coordination between the transmitter and receiver sections of the modem of the present invention. This tone maintains timing and frequency calibration or "alignment" irrespective of the telephone network's carrier heterodyne errors or changes in transmission path length. The transmitter and receiver portions of the modem of the present invention operate in conjunction with one another in a coordinated manner to deduce real time information on the performance of the telephone channel being used. All significant signal parameters are measured and corrective signals are returned to the originating modem on a simultaneous reverse channel. Carrier frequencies, generally located at the end of the usable spectrum (but not always), which are impaired from any number of causes are removed from the ensemble. In the modem of the present invention, the spectrum spacing is minimized so as to permit the simultaneous transmission of both 9600 bps or greater in one direction (as high as 1200 bps in a preferred embodiment) together with 300 bps in the reverse direction on a single, two wire, dial up telephone line.

Several levels of close interaction and coordination are important between the receiver and the transmitter sections of the modem of the present invention in order to permit maximum error-free data transfer. Data packets are exchanged between the transmitting and receiving sections and use interleaved cyclic redundancy checking (CRCs). Repeat transmission is used upon the detection of errors. This permits the error-free conveyance of data, housekeeping information (e.g. ordering of packets), and diagnostic signals. This arrangement permits adaptation of the modulation of the carriers in order to achieve data transmission at the maximum possible effective error-free rate for the channel. In the event of impairment, the actual data throughput capacity gradually decreases by dropping out defective individual carriers until a new equilibrium point of error-free transfer is reached. It is thus clear that unlike modems of the prior art which "gearshift" down the transmitted data rate by a factor of two or four in the presence of impairments to the telephone line, the modem of the present invention reduces its throughput data rate by only approximately 1/64th of its capacity per step. Typically, single step reductions in data throughput will be all that is necessary to surmount most impairments.

The present invention also includes the use of a pulsed pilot tone to effect correction of telephone line amplitude variations, amplitude hits, frequency offsets, phase drift, and phase hits. Frequency distortion is essentially removed in the modem of the present invention by modulation of the amplitude of the local oscillator equivalent circuit for each of the sixty-four (64) tones in the ensemble. Phase distortion and channel cross-talk are removed by processing calculations which are based upon initial transmission of a known test pattern.

An important advance over the prior art of the modem of the present invention is packetization of all data and housekeeping information. The modem of the present invention handles all data on a packetized basis and permits intermixing of a multiplicity of data streams. Each data stream may operate at almost any speed or protocol combination by virtue of packetization permitting a degree of flexibility never before achieved. In a preferred embodiment the duration of each frequency ensemble is 2/75th of a second. In this period are transmitted up to 320 bits as an ensemble packet which contains both data and error detection means. This permits closed loop feedback between the transmitting and receiving modems to be based upon new error-free intelligence.

The packetizing and extensive test signal arrangements in the modem of the present invention also permit ready use of packets containing solely test data. These packets are useful in order to provide remote diagnostics and to pinpoint transmission faults. The modem of the present invention measures amplitude, noise, phase delay, and frequency offset for each of a large ensemble of frequencies; these measured parameters are characteristics solely of the communication circuit and not of the modem. Such measurements are stored over a series of periods to provide operating statistics to a remote modem or diagnostic center in a form that unambiguously defines transmission line problems. To aid in the process of rapid line fault diagnosis, a separate telephone line can be made available that automatically connects to a remote data center. This separate circuit forms the transmission path for the readout of statistics, and it also forms a voice intercom permitting the operating personnel at the modem site to communicate with the connected modem or to a remote diagnostic center.

In a preferred embodiment of the present invention, sine and cosine vectors for each of sixty-four (64) separate frequencies are generated for each carrier. Each is derived digitally. The symbol transmission period is 2/75th of a second, and each symbol conveys five (5) bits using thirty-two (32) combinations of phase and amplitude modulation. The definition of the phase and amplitude combinations is called a "constellation" and in the present invention is selected as a function of the characteristics of the real time impairments encountered on the telephone line.

The preferred embodiment is described in terms of sinusoidal carrier frequencies. However, the invention is not so limited in theory; other orthogonal wave shapes could be utilized in lieu of conventional sinusoids. Specifically, pseudo-random but orthogonal noise streams could be used instead. Each pseudo-random waveform would be stored in a read only memory (ROM). The waveform would be one epoch in length and could be amplitude modulated. Separation of the waveforms occurs by multiplication by an identical set of waveforms in the receiver by use of noise as a spread spectrum transmission concept. The nature of the detection process in this modem of the present invention in which each channel is anticipating a particular waveform over a relatively long epoch period tends to lend itself to the transmission of a simultaneous ensemble of pseudo noise channels. This arrangement is particularly fitting to insure privacy.

It is thus an advantage of the present invention to provide a digital data modem capable of reliably operating in full duplex modem over a dial up telephone line at data rates in excess of 9600 bps by allowing closest spacing between adjacent carriers without frequency-to-frequency crosstalk permitting more data channels within the telephone passband.

It is another advantage of the present invention that data throughput degradation in the presence of telephone line impairment is gradual and tailored to the particular form of line impairment.

It is another advantage of the present invention to be able to utilize a dial up telephone line with significantly higher phase error and frequency attenuation rolloff than previously possible.

It is yet another advantage of the present invention to utilize asynchronous data transmission and reception in the form of packetization of data and housekeeping functions.

It is yet another advantage of the present invention to permit the concurrent multiplexing of a plurality of signals, both asynchronous and synchronous.

It is yet another advantage of the present invention to permit operation using a wide range of data communications protocols. These and other objects and advantages of the present invention will become apparent by referring to the drawing figures in conjunction with the description of a preferred embodiment.

BRIEF DESCRIPTION OF THE DRAWINGS

FIG. 1 is a high-level block diagram of the high speed modem of the present invention.

FIG. 2 is pictorial representation of the transmit and receive ensembles of the present invention.

FIG. 3 is a functional block diagram of the signal generator/hybrid of the high speed modem of the present invention.

FIG. 4 is a functional block diagram of the signal extractor of the high speed modem of the present invention.

FIG. 5 is a functional block diagram of the vector definer of the high speed modem of the present invention.

FIG. 9 is a functional block diagram of the loading docks and the shipping department of the present invention.

FIG. 10A is a pictorial representation of the bits transmitted for each of the sixty-four (64) carriers for two time epochs of the present invention.

FIG. 10B is a pictorial representation of the bits transmitted in a reverse channel for each of nine (9) frequencies for two time epochs of the present invention.

FIG. 11A is a pictorial representation illustrating binary signals as a function of time for two epochs to transmit a 640 bit packet according to a preferred embodiment of the present invention.

FIG. 11B is a pictorial representation illustrating the housekeeping and data assignments for a hypothetical packet according to a preferred embodiment of the present invention.

FIG. 11C is a pictorial representation illustrating the number of bits in each field comprising an exemplary packet according to a preferred embodiment of the present invention.

DESCRIPTION OF A PREFERRED EMBODIMENT

Introduction

Figure 6:
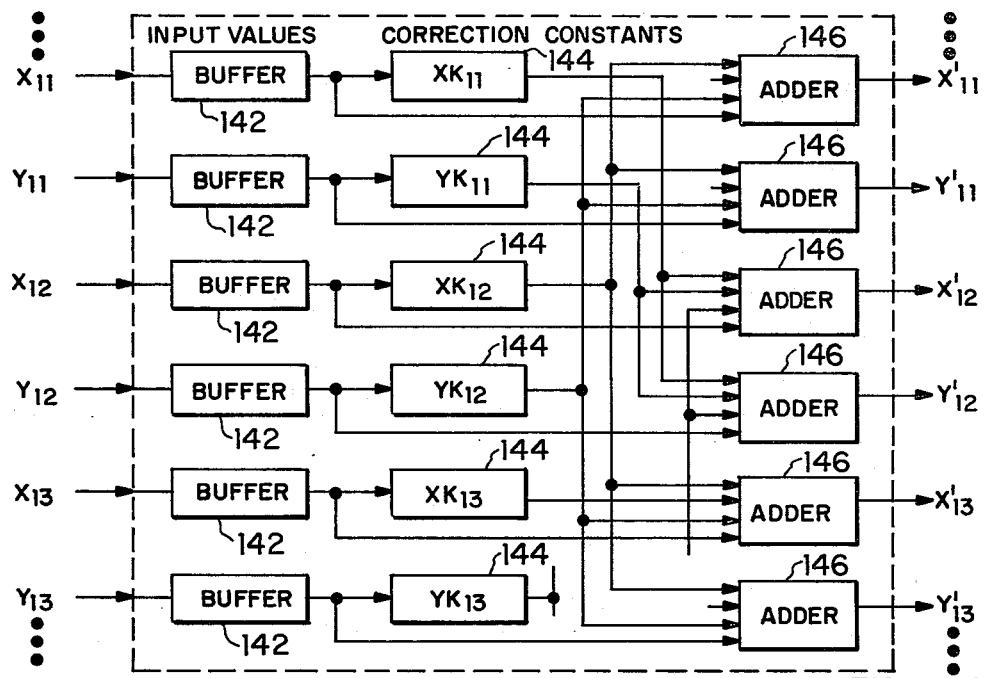
FIG. 6 is a functional block diagram of the crosstalk reducing circuit of the high speed modem of the present invention.

Referring to FIG. 1, a preferred embodiment of the high speed modem of the present invention is shown by the general reference numeral 10. High speed modem 10 performs both transmitting and receiving functions over a telephone line 12 in conjunction with a similar high speed modem 10' (not shown) located remotely at the opposite end of telephone line 12. Telephone line 12, typically a 300 to 3100 Hz dial up telephone channel, connects to a signal generator/hybrid 14 adapted to separate the transmit path from the receive path. Also contained within signal generator/hybrid 14 is the circuitry for generation of the transmitted signal described in detail hereinbelow in connection with FIG. 3.

Signals received by signal generator/hybrid 14 are passed onto a signal extractor 16. Within signal extractor 16 each component of the undesired transmitted signal is removed from the complex received waveform. The output of signal extractor 16 passes onto a vector definer 18. The vector definer 18 computes the two values of the received sinusoidal signal. These two values are referred to hereafter as the x and y vector components and interchangeably referred to as the sine and cosine channels, respectively. The output of the vector definer 18 branches into two paths. One path leads to a constellator 20 which matches the received x and y vectors to the closest fitting probably expected signal combination. The other path from the vector definer 18 leads to a reference corrector 22 where the frequency, time, and amplitude characteristics of the reference signal are extracted and compared with its expected value and corrections made accordingly.

The output of the constellator 20 proceeds to a diagnostics analyzer 24 which extracts performance information necessary for the coordination of the sending and receiving modems and for diagnostics purposes. Diagnostics analyzer 24 performs such functions as determining whether any frequency channels are exhibiting excessive noise levels. Diagnostics analyzer 24 also generates statistical estimators of individual channel phase delay, amplitude distortion, noise, etc. The information from the diagnostics analyzer 24 is formed into packets and sent to a shipping department 26. The shipping department 26 is responsible for the organization of information into packets for the purpose of transmission and for the disassembly of packets in the case of reception of information. Packet switching and the packetization of information itself is well known in the prior art of data communications. The techniques of packet switching will not be described herein other than to note that most information within the high speed modem 10 of the present invention is transferred in the form of standard size packets of information each containing a header together with housekeeping data which facilitates information transfer between a sending high speed modem 10 and a remote receiving high speed modem 10'. Internal interlaced error correction symbols permit the detection of error with a high degree of certainty. Errors are generally corrected by the repeat transmission of defectively received packets. Packets between the shipping department 26 and the outside world (i.e. a computer system to which high speed modem 10 is connected) are sent and received by one or more loading docks 28. Each loading dock 28 is tailored, generally by software command, to match the precise interface requirement of the data user's equipment. For example, many data terminals utilize a standard RS-232-C connector and voltage levels. A loading dock 28 would be used to connect to such an RS-232-C interface. The loading docks 28 also remove and add housekeeping data from the packets so that the output serial data stream appears to the user as input to the transmitter with the visibility of added information required by the packet switching process itself.

Ensemble Description

Referring to FIG. 2, a diagramatic representation is shown of the transmit and receive channels that form the transmit and receive ensembles for the high speed modem 10 of the present invention. High speed modem 10 simultaneously transmits an ensemble of frequencies 30 and receives an ensemble of frequencies 32. High speed modem 10 is designed in a preferred embodiment to operate wth either four-wire telephone circuits (i.e. two lines) or two-wire telephone circuits (i.e. a single line). With a four-wire circuit connection (not illustrated), the full spectrum from 300 Hz to 3 kHz is available in both directions simultaneously. In the two-wire case (that shown in FIG. 2), separation between the transmit ensemble 30 and the receive ensemble 32 is imperfect. Frequency division is thus used to separate the two directions. FIG. 2 shows the transmit ensemble 30 assembled from sixty-four (64) separate frequencies occupying the band from approximately 600 Hz to 3 kHz. Receive ensemble 32 is depicted in FIG. 2 to be of proportionately narrower bandwidth occupying only the band from approximately 300 Hz to 500 Hz. This particular choice of frequency allocation capitalizes upon the statistical reality that heavy data flows will generally occur in one direction with a lesser flow in the reverse direction. The receive channel or receive ensemble 32 is utilized to convey user data as well as carrying acknowledgements that transmitted packets were in fact correctly received. If no acknowledgement is received, then the previously transmitted packet ensemble is retransmitted.

In FIG. 2, a plurality of vertical lines 34 separate each ensemble into time increments of 2/75th of a second, known hereafter as "epochs". Each epoch or epoch period is used to transmit a different coded ensemble of frequencies wherein each tone or frequency is phase and amplitude encoded to convey a multiplicty of bits. In a preferred embodiment, each tone is encoded with five (5) bits of information; this creates thirty-two (32) discrete combinations of phases and amplitudes (i.e. the well known "constellation"). The composite sixty-four (64) channel capacity comprising transmit ensemble 30 permits conveying up to 320 bits in an epoch or 2/75th of a second. This is the equivalent of 12000 bps. However, in a preferred embodiment channel #32 of transmit ensemble 30 is utilized solely for reference purposes. That is, channel #32 cyclically transmits at full intensity for one epoch, off for two epochs, on for one, off for two, etc. The amplitude of channel #32 establishes an amplitude reference. The beginning and end of transmissions of channel #32 precisely establish the time boundaries for an epoch. Further, the frequency of channel #32 as received by a remote high speed modem 10′ provides reference information utilized to correct heterodyne frequency offset that often occurs in passage through the telephone company's carrier system.

A second reference signal 35 is used in an identical manner in the return receive ensemble 32. In the case of using high speed modem 10 with a four-wire circuit connection, the return channel occupies the full 500 Hz to 3 kHz bandwidth since it would be otherwise unused. A four-wire conection thus permits nominally 12,000 bps in both directions simultaneously, less the capacity used for reference channels and internal housekeeping functions. With a good quality dial up telephone line, high speed modem 10 of the present invention should achieve on the order of 11,000 bps. However, if the line quality did not so permit (i.e. in the presence of impairments), certain of the impaired channels would be dropped lowering net data throughput by a factor of 1/64th per channel dropped. This "graceful" degradation of the net data throughput for the high speed modem 10 of the present invention is to be contrasted with the drastic "gearshifting" arrangement utilized on modems of the prior art where minor impairments can reduce the net data throughput by 50% or more.

Signal Generator/Hybrid

Referring to FIG. 3, a detailed description of the signal generator/hybrid 14 is shown. As briefly described above in connection with FIG. 1, signal generator/hybrid 14 generates the transmit ensemble 30. All of the tones comprising transmit ensemble 30 consisting of sequential digital values, each digital value of which represents an analog signal value identical to the signal value components of a bank of equivalent analog oscillator circuits are derived within the signal generator/hybrid 14 from a common crystal oscillator 36. Although high speed modem 10 is actually two modems, a receive modem and a transmit modem, crystal oscillator 36 provides master timing information for both functions. Thus, both modems maintain an integral timing relationship. With few exceptions, the absolute timing difference between the transmit and receive modems is a measurement of the long distance telephone network propagation delay which tends to stay fixed for the duration of each telephone call.

Crystal oscillator 36 is connected to a timing signal generator 38 which in conjunction with a counter 39 provides a plurality of timing signals 40 used throughout high speed modem 10. The following technique described to generate digital values of tones is similar to the technique used for generating an ensemble of tones in state of the art electronic musical instruments. Frequencies 1 through 64 as shown are generated in an interleaved manner by use of a time shared read only memory (ROM) 42, an adder 44, and a sine/cosine table ROM 46. The output of ROM 42 is a series of digital values. Each value may correspond to an angular increment used to generate pulse code modulation (PCM) values of an ensemble of frequencies. As in standard PCM practice, a sampling interval is used which is at a rate at least twice the frequency being sampled, or the (Nyquist rate). At sixty-four (64) discrete locations within ROM 42 are stored a plurality of incrementing values 43 corresponding to the sixty-four (64) frequencies to be derived from timing signals 40. Each incrementing value 43 is added to the past sun in an adder 44 which acts as an integrator. The lower order bits from adder 44 form input addresses 45 to the sine/cosine table ROM 46. The pulses which constitute timing signals 40 are counted in an address counter 39. As the value within address counter 39 is sequentially incremented, a different location of ROM 42 is sequentially addressed producing each of the sixty-four (64) tones or carriers.

The sine/cosine ROM 46 contains values corresponding to the sine and the next sequential address, the cosine. Signals within high speed modem 10 are transmitted by generating two vector components. The first vector component is a sine value 48, and the second vector component is a cosine value 50. Data which is to be transmitted enters at point 52 and is organized into groups of five (5) bits each. Each five (5) bit group represents a particular combination of vector coordinates. With five (5) bits thirty-two (32) separate values or composite vectors are required for tranmission. As the ideal choice of angle and magnitude for each of these vectors depends somewhat upon the nature of the communication line used, the choice may be parameterized and selected from a read-only-memory as required. This is shown schematically in FIG. 3 as a switch 54. Switch 54 chooses one of a plurality of 5 bit input x,y vector amplitude ROM's 56. The output of each vector amplitude ROM 56 is an x value 58 and a y value 60. The x value 58 from vector amplitude or constellation ROM 56 is received by a multiplier 62. Within multiplier 62, x value 58 is multiplied by sine value 48 from the sine/cosine ROM 46. Shortly thereafter, the y value 60 from vector ROM 56 is multiplied within multiplier 62 by cosine value 50 from the sine/cosine ROM 46 (x value only illustrated in FIG. 3). This process is repeated for the next frequency modulated by the next five (5) bits to be transmitted. This continues until all 320 bits have been sent using all sixty-four (64) frequencies. In a preferred embodiment of the present invention, the per sample point time is very fast. During the single epoch period each frequency will be sampled 512 times. This corresponds to 19,200 samples per frequency per second.

Digital output 64 of the multiplier 62 is received by a digital to analog (D/A) converter 66. D/A converter 66 converts digital signals 64 into analog values 68. A low pass filter 70 removes unwanted higher frequency products and the filtered analog signal 72 is then sent to hybrid 74. Hybrid 74 has the function of transmitting the analog signal over telephone line 12. In addition to the transmitting function, hybrid 74 also separates a received signal 76 from telephone line 12 in the case of a two-wire circuit. Hybrid 74 is a bridge balancing device resulting in a difference in the adjustment to hybrid 74 as different telephone line impedances are encountered. A rough first order correction to hybrid 74 is provided by a digital signal 78 via a D/A converter 80. The analog output 82 of D/A converter 80 adjusts the gain of hybrid 74 in order that the transmitted signal have minimum cross talk with the receive channel. It should be noted that the primary channel separation mechanism is frequency division between the transmit channel and the receive channel as the two frequency bands do not overlap. Adjustment to hybrid 74 is used only for second order correction to further reduce reception of spurious energy.

Signal Extractor

Referring to FIG. 4, a detailed functional schematic of the signal extractor 16 is shown. Received signals 76 enter signal extractor 16 and are first filtered by a band pass filter 84 designed to remove extraneous frequencies outside of the useable spectral pass band. An output signal 86 of band pass filter 84 is multiplied in a multiplier 88 by a multiplier signal 90 from a D/A converter 92. D/A converter 92 serves as an analog multiplier to grossly adjust the amplitude of the overall received channel signal 86. After gain adjustment in multiplier 88, a receive signal 94 is passed onto a local oscillator multiplier 96. The amplitude value of multiplier signal 90 is controlled by D/A converter 92 by a peak detector 93 which insures that the input signal to D/A converter 92 does not exceed the linear ceiling of the multiplier 88.

Into the local oscillator multiplier 96 are passed a plurality of tones 98 which comprise a series of frequencies similar to those transmitted but of constant amplitude. Constant amplitude is achieved for the product of the received signal 86 impaired by losses on the telephone line 12 by adjusting the gain of each local oscillator tone 99 individually in a channel gain control amplifier 100. Unique to the present invention, information relating to the individual channel gain characteristics for each of the sixty-four (64) carriers is stored in a channel gain random access memory (RAM) 102. The information deposited within RAM 102 stored at a plurality of separate addresses 104 is derived from individual gain measurements for each of the carriers transmitting known amplitudes during dial up connection initiation. After initiation the received values are quantized to one of several known amplitude values insuring that the gain in precisely maintained. Each channel gain adjustment constant is called up synchronously from RAM 102 and used to instantaneously adjust the gain of the gain control amplifier 100 processing the local oscillator signals. This is equivalent to modifying the strength of the received signal 94.

It is a common telephone line impairment that a frequency offset exists between transmitted and received signals caused by the telephone carrier system. Signal extractor 16 accounts for this hetrodyne offset error of the telephone system by introducing an offset control signal. As described above in connection with signal generator/hybrid 14, ROM 42 contains the values to be selected for the local oscillator frequencies 1 through 64. These values are selected to generate frequencies that are interleaved between the assigned transmitting frequencies. The frequencies selected from ROM 42 pass onto the incremental adder 44. A second common digital value, i.e. an offset control signal, is added to each adder circuitr 44 in order to constitute a frequency offset control. The offset control signal is derived from the reference corrector/generator 22 (connection not explicitly shown). The value of the offset control signal is precisely determined so that the output of the sine/cosine ROM 46 (i.e. the sine value 48 and the cosine value 50) exactly match those of the transmitted ensemble 30. This is actually achieved by varying the reference frequency (i.e. frequency #32) until it achieves its exact anticipated value. In a preferred embodiment, this scheme permits correction of heterodyne offsets as great as plus or minus 18 Hz, larger than will ever be encountered in a telephone system. This large range of hetrodyne correction is useful on single sideband radio channels where larger frequency offsets can occur. It is also useful in situations employing radio channels where moving stations cause a doppler shift.

Vector Definer

Referring to FIG. 5, a detailed functional schematic of the vector definer 18 is shown. The vector definer 18 is used to achieve matched frame coherent detection. An input signal 108 to vector definer 18 is received from the signal extractor 16. Each sample has already been multiplied by the local oscillator/multiplier 96 and thus represents each different frequency to be integrated. Integration is readily accomplished since each signal 108 is a digital value of the estimated value. Input signal 108 is applied to a plurality of sample integrators 110. Sample integrators 110 actually are contructed from individual sine integrators 112 and cosine integrators 114 for each discrete carrier or frequency (i.e. 64 in the case of a preferred embodiment). Naturally, there is much background noise in the signal applied to each sample integrator 110 as the signal 108 contains energy from irrelevant channels as well as the specific channel desired. Fundamental to this form of detection process is the premise that the desired signal energies will add within sine integrators 112 and cosine integrators 114 with each separate integrated addition while the unwanted signals (at least with respect to a particular integrator) occur orthogonally. That is, the unwanted signals sometimes add, and, just as often on a statistical basis, subtract from the values in sine integrators 112 and cosine integrators 114. It is the use of a large number of samples which permits the desired signal to be extracted from the noise. After the integration process, the output signals from integrators 112 and 114 pass through a plurality of buffers 116.

As briefly discussed above, the reference channel (i.e. frequency #32 in a preferred embodiment) is pulsed at full amplitude for one epoch and at zero amplitude for two epochs. The edges of this pulsing of the reference channel provide the basic timing information needed by the sample integrators 110; that is, when to start and when to dump. However, there is a second order difficulty that needs to be resolved that relates to timing, or more properly, phase distortion. In the high speed modem 10 of the present invention, each epoch is approximately 26.7 milliseconds in duration. Telephone line phase delay is commonly on the order of 2 milliseconds or more. Further, this phase delay is significantly worse near the edges of the 3 kHz pass band. Thus, if each integrator 110 (i.e. sine integrators 112 and cosine integrators 114) started at the same time, the channels located at the pass band edges would generally exhibit maximum phase shift error. It is clear that the value within some integrators 110 could be as much as 10% in error (i.e. such integrators 110 would contain as much as 10% of their values from energy from the previous epoch period). Such phase distortion is unacceptable in such a high performance modem as the the one described herein.

The approach utilized to correct for this phase distortion which varies across the 3 kHz pass band is to use a measurement of the phase delay of each of the sixty-four (64) carrier frequencies with respect to the reference channel as a phase correction factor. This permits a correction factor to be generated separately for each of the sixty-four (64) carriers as if each sample integrator 110 had been started and stopped precisely at the temporal boundaries of each epoch. Thus, a portion of vector definer 18 functions as a phase distortion corrector as noted in FIG. 5. The phase distortion correction process begins by passing the output of each buffer 116 through a delay line 118 in order to preserve the previous value from integrators 112 and 114. The actual values from integrators 112 and 114 are individually multiplied in a plurality of multipliers 120 by a plurality of individual correction constants 122. The value of each correction constant 122 (i.e. K1 through K64 in FIG. 5) is determined automatically at the time that telephone connection is first established or at the time of a "hot" restart (e.g. a restart after the error rate has exceeded an acceptable limit). In a preferred embodiment of the high speed modem 10 of the present invention, the technique used to measure the pass band phase distortion is to turn on every third carrier for an epoch and then to measure the energy contained in the following epoch. The energy "hanging over" during the following epoch is a measurement of (i.e. directly proportional to) the phase delay relative to the reference channel used for the epoch timing.

Therefore, the output of multipliers 120 is subtracted in a plurality of subtractors 124 from the values received from buffers 116 suitably delayed by delay line 118 from the previous epoch. In a preferred embodiment of the present invention, delay line 118 is actually implemented as random access memory; i.e. values are actually stored in the random access memory and recalled at the proper time which effectively works the function of a classic delay line. The phase distortion correction process takes place on a per epoch basis as shown. Only approximately 4800 corrections per second are required for acceptable accuracy.

A phase corrected x value 126 and a phase corrected y value 128 are used to produce polar coordinate values for further processing. The magnitude of the radius vector is computed by a squaring operation 130, a summation of the squares 132, and a square root operation 134 performed upon the sum of the squares of the x and y components. These operations in practice may be performed by computation or by a use of a table stored in a look-up ROM. Similarly, the angle of the radius vector is determined by calculating the arctangent of the x value divided by the y value. The division of the x component by the y component is performed in an operation 136 and the arctangent is determined by an operation 138. Both the division operation and the arctangent computation may be accomplished by storing expected values in a look-up table ROM or by computation.

Crosstalk Reducer Circuit

Referring to FIG. 6, an optional crosstalk reducer circuit is shown by the general reference numeral 140. Crosstalk reducer circuit 140 provides a second level of correction for signals that "leak" from one frequency carrier into an adjacent frequency carrier (it is possible for crosstalk to occur beyond adjacent channels, but adjacent channel crosstalk is the major component). Of course, the individual carrier band centers are spaced apart by approximately 37.5 Hz in order to minimize channel-to-channel crosstalk. In FIG. 6, three representative frequencies each having two vectors (i.e. x11, y11, x12, y12, x13, y13) representative of the full set of sixty-four (64) frequency carriers. Each vector is stored in a RAM buffer 142. This value is multiplied by a correction coefficient k stored in a RAM buffer 144. The actual correction takes place in a plurality of adders 146. Circuit 140 thus provides a degree of crosstalk reduction accomplished in a manner conceptually similar to the phase correction circuitry utilized in the vector definer 18. That is, at the time of initial telephone connection, every third frequency channel is turned on at full amplitude for one epoch. The magnitude of energy that is detected in otherwise quiescent adjacent channels is proportional to the adjacent channel crosstalk and used as a reference. This information is then stored in RAM buffers 144 and used to form a correction constant k which is multiplied by the output of the phase distortion correction circuitry of vector definer 18 and then subtracted (by negative addition) therefrom. This process is repeated for each of the sixty-four (64) channels until the RAM has stored for a particular telephone connection the magnitude of adjacent channel crosstalk from any channel into an adjacent channel.

Crosstalk reducer circuitry 140 is placed after the phase distortion correction circuitry operating upon corrected x values 126 and corrected y values 128 and before the rectangular to polar conversion circuitry of vector definer 18.

Each of the sixty-four (64) carriers conveyed as two vectors (x1, y1, x2, y2, . . . , x64, y64) forms an input to the crosstalk reducing circuit to produce the corresponding output vectors x1', y1', x2', y2', . . . , x64', y64'.

Reference Corrector/Generator

Figure 7:
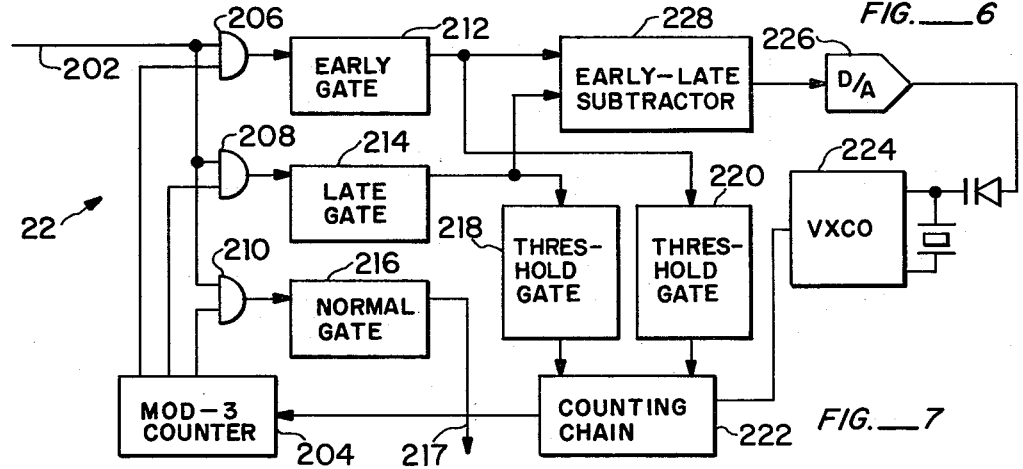
FIG. 7 is a functional block diagram of the reference corrector/generator of the high speed modem of the present invention.

Referring to FIG. 7, a reference corrector/generator 22 for the high speed modem 10 of the present invention is shown by the general reference numeral 22. Reference corrector/generator 22 uses incoming timing information so that sample integrators 110 of vector definer 18 start integration and reset precisely at the boundaries of epochs. The basic input to reference corrector/generator 22 is a reference signal 202 (i.e. carrier frequency 32 in a preferred embodiment). From a random start position, the energy in the reference signal 202 is measured with respect to three consecutive epochs. If properly timed, the central epoch should contain all of the energy; the first (or early) epoch should contain zero energy; and the last (or) late epoch should contain zero energy. A modulo-3 counter 204 sequentially opens and AND gate 206, an AND gate 208, and an AND gate 210. When AND gate 206, 208, and 210 are "on" as determined by modulo-3 counter 204, then energy will be accumulated within an early gate 212, a late gate 214, and a normal gate 216, respectively. If input signal 202 is properly timed with respect to modulo-3 counter 204, then all energy will reside within normal gate 216. The output from the normal gate interval forms a timing signal 217 used by the vector definer 18 to mark the start and end of epoch integration periods.

Figure 8:
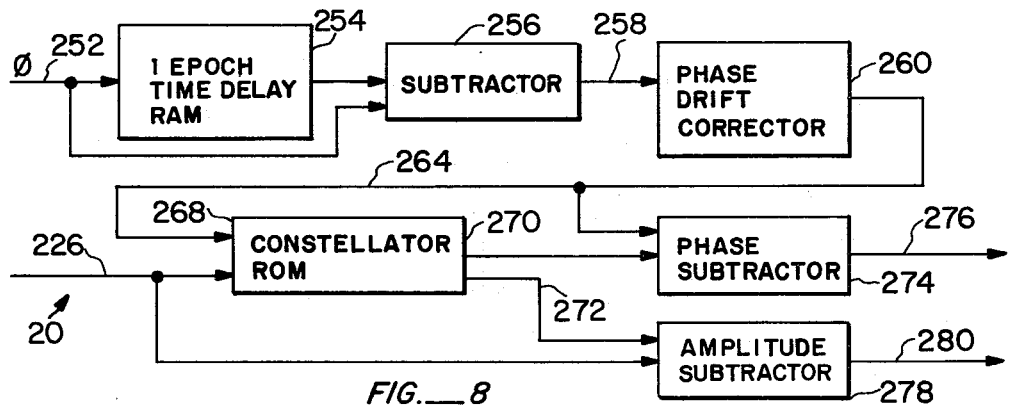
FIG. 8 is a functional block diagram of the constellator of the high speed modem of the present invention.

A threshold detector 218 and a threshold detector 220 store the energy received in the early gate 212 and the late gate 214. If either value exceeds a predetermined threshold value, then a very coarse adjustment is made by resetting a common counting chain 222. However, if high speed modem 10 has been in recent synchronism or if the energy in the early gate 212 and the late gate 214 is sufficiently small, then only a gradual phase shift correction is required. This is effected as shown in FIG. 8 by corrective input to the counting chain 222 by a voltage controlled oscillator 224. Note that as most all of the processing takes place within the digital domain, a D/A converter 226 receives a digital input from a subtractor 228 for feedback correction to the oscillation frequency of voltage controlled oscillator 224 in a manner which produces a long time constant correction not sensitive to minor short term perturbations.

Constellator

Referring to FIG. 8, a detailed functional schematic of the constellator circuit 20 is shown. It is the function of the constellator 20 to analyze the phase and amplitude values obtained from vector definer 18 and to match said phase and amplitude values (i.e. the defined vectors) with the closest values stored in a ROM (i.e. constellation vectors) which correspond to specific data patterns. This is a closest-fit, table look-up process. More precisely, phase information in a preferred embodiment of the present invention is decoded by determining the *difference* in phase from one epoch to the next. Utilizing the technique of differential phase shift modulation removes the necessity of maintaining a very long term precise and absolute phase relationship for each of the sixty-four (64) channels.

In FIG. 8, a phase signal 252 for a particular epoch is obtained from vector definer 18. The phase signal value from the previous epoch is stored in a time delay RAM 254. The difference in phase between the present epoch and the previous epoch is calculated in a subtractor 256. A difference signal 258 is then passed onto a phase drift corrector 260. Phase drift corrector 260 is a subtractor which corrects the difference signal 258 by a small amount with respect to a phase correction signal (not shown) obtained from the reference corrector/generator 22 in order to account for any second order drifts not previously removed.

A corrected phase value 264 is thereafter passed along with an amplitude value 266 derived from vector definer 18 to a constellator ROM 268. A comparison of the paired values within the ROM 268 is thereafter undertaken with the derived amplitude value 266 and corrected phase value 264. A closest phase angle 270 and a closest amplitude value 272 as stored within ROM 268 form a unique vector which corresponds to a unique data pattern. In a preferred embodiment of the high speed modem 10, five (5) bits are encoded in each epoch of each data channel. Thus, there are thirty-two (32) pairs of amplitude and phase values or thirty-two (32) vectors stored within ROM 268. Simple algorithms perform the matching and output a data pattern. Clearly, if none of the stored vector pairs matches the received and defined vectors or if the received vector value is too far away from the stored values, an error will result. Short of an error, high speed modem 10 of the present invention has the facility to monitor the error angle or phase difference between the stored angles and the received angle. The same is true for the difference between the stored amplitudes and the received amplitude. This information is of interest for diagnostic analysis of the performance of high speed modem 10 and the analysis of the characteristics of the telephone connection. Referring to FIG. 8, closest phase angle 270 and measured (or received) phase angle 264 are received by a phase subtractor 274. A phase error signal 276 is thereafter available for error monitoring. A high level of phase error provides information that one or more channels has a high probability of error and should consequently be ignored. This logic is provided in a microprocessor (not shown) which sends packets to the connected modem 10' containing the individual channel performance characteristics. Similarly, the closest amplitude 272 and the derived amplitude value 266 are passed onto an amplitude subtractor 278. The amplitude difference is calculated and an amplitude error signal 280 is thereafter available to permit modification of the individual channel gain values 104.

Packet Transmission

Referring to FIG. 9, transmitting modem 10 and its receiving counterpart modem 10' are illustrated exchanging information in the form of a packet 300 and a packet 300' (for ease of illustration, prime notation as used herein refers to structures within modem 10' corresponding to equivalent structures within modem 10). Both housekeeping information and user data are transmitted. Housekeeping includes information such as the definition of the unusable channel frequencies and the failure of error detection checksums. Error detection checksums (e.g. cyclic redundancy checks) are used to insure essentially error-free overall data transmission. Additional housekeeping information is needed when multiplexing signals from a plurality of data sources connected to the plurality of separate loading docks shown by the general reference numeral 28. Each loading dock 28 has a unique address value, and in a preferred embodiment of the present invention, loading docks are numbered from 0 to 15 (established by a four bit address discussed hereafter). In FIG. 9, a specific loading dock 0 (LD0) is shown by the reference numeral 302. Similarly, specific loading docks 1 and 2 (LD1 and LD2) are shown by the reference numerals 304 and 306, respectively. Each loading dock 28 within modem 10 presents the illusion that it is physically connected (i.e. a "virtual" connection) with a corresponding loading dock 28' located within modem 10'. That is, loading dock 302 operates as if connected with loading dock 302'. Similarly, loading docks 304 and 306 operate as if physically connected with loading docks 304' and 306', respectively. Internally addressed packets within modem 10 are directed from virtual loading dock 302 to virtual loading dock 302'. Packetization of data allows the efficient transmission of a multiplicity of data sources where each source may have a different data rate from moment to moment. Further packetization of data permits effective data transmission even with a communications channel which is subject to time varying uncorrectable perturbations.

Referring to FIG. 10A, an instantaneous snapshot of two separate epoch periods of the transmit channel 30 are illustrated. Information from modem 10 to modem 10' is conveyed in the form of ensembles of sixty-four (64) frequencies. As explained briefly above, each frequency carrier is modulated (phase and amplitude) to thirty-two (32) states in order to accommodate five (5) bits. Each epoch therefore transmits sixty-four (64) carriers of five (5) bits each for a total of 320 bits.

In FIG. 10A, frequency 32 is shown blackened to denote that in a preferred embodiment of the present invention it is not used for data but for synchronization purposes. For purposes of illustration, frequency 37 is also shown blackened, because it has been dropped as a data channel due to crosstalk from an adjacent telephone wire cable. Further, frequencies 63 and 64 are also shown blackened because due to excessive noise (located at the passband edges) they too have been dropped from the ensemble for carrying data.

Referring to FIG. 10B, the reverse ensemble 32 is illustrated. In a preferred embodiment of the present invention, nine (9) carriers generally located in the 300 Hz to 500 Hz band comprise the reverse channel. In the reverse channel 32 as in the transmit ensemble 30, each carrier frequency conveys five (5) bits. In reverse channel 32 as illustrated in FIG. 10B, frequency 73 is shown blackened or unavailable for data transmission, because frequency 73 is utilized for reference purposes.

Referring to FIG. 11A, a serial representation of the output data stream from the ensembles of FIG. 10A is illustrated. An ensemble 330 and an ensemble 331 are transmitted within epoch i and epoch i+1, respectively. The concatenation of ensembles 330 and 331 comprises a single packet 334 which contains a total of 640 bits in a preferred embodiment. The longer packet length tends to reduce the loss in net data rate caused by overhead functions associated with each packet.

Referring to FIG. 11B, the internal structure of the 640 bit packet of FIG. 11A is shown. The first data group is a four (4) bit address 346 uniquely assigned in a preferred embodiment to a loading dock with active traffic. In FIG. 11B, the address of loading dock 302 (i.e. 0000) would be within the first address field 346. After the loading dock address 346 within packet 334 is found a field 348 which corresponds to the number of four bit groups or "nibbles" contained within the data portion of the packet which are to be received by loading dock 302'. The unique addresses 346 of all loading docks with active traffic are successively followed by fields 348 denoting the number of four bit nibbles to be found within the actual data field (described hereafter). All fields 348 contains eight (8) bits in a preferred embodiment of the modem 10 of the present invention (eight bits permit a maximum of 256 four bit nibbles or 1024 bits of data shipped per loading dock; as a whole packet can only be 640 bits, an eight (8) bit field 348 is clearly sufficient). A terminator 350 denotes the end of the successively alternating loading dock addresses 346 and nibble fields 348. Terminator 350 contains four bits which constitute the address of a non-existent loading dock thus informing the receiving modem 10' of the end of the stream of loading docks 28 having information to be shipped.

Following terminator 350 is a two bit modulo-4 sequence number 352 (i.e. 0, 1, 2, or 3). This is followed by another two bit field 354 received for the sequence number of the last correctly received packet. In operation, each packet is assigned its own sequence or serial number 352. Sequence numbers 352 keep incrementing by one for each packet shipped in a modulo-4 pattern. As field 354 contains the the two bit sequence number of the last correctly received packet, the contents of field 354 serves as an acknowledgement. If field 354 contains a value *other than* the sequence number of the last packet transmitted, transmitting modem 10 must retransmit the last packet.

Following field 354 are a plurality of data fields 356. Each data field 356 corresponds to a particular loading dock address 346 and contains exactly the number of nibbles of data within field 348. An important aspect of the present invention over prior art modems is that separate headers are *not* required to separate data fields 356. This is because modems 10 and 10' are perfectly synchronized to transmit packets precisely at epoch boundaries, and each data field 356 is distinguishable from adjacent fields because the header information of the packet (i.e. fields 346 and 348) informs the receiving modem 10' of exactly how many data bits to expect. A further important aspect of the modem of the present invention over the prior art is the ability to multiplex a series of data inputs (i.e. from different loading docks 28) with a minimum of visible delay time for each multiplexed channel. This result is achieved because a separate packet is *not* required for each data source in the modem of the present invention and information may be shipped when available from each loading dock rather than waiting for buffers to fill.

There are two further fields within a standard packet of the high speed modem 10 of the present invention. Following the data fields 356 is a cyclic redundancy check 358 (CRC). A 16 bit or 24 bit CRC is sufficient to insure adequate error-free performance of the modem 10. Lastly, a filler field 360 is appended to the CRC 358 in order that packet 334 have a total of 340 bits.

Referring to FIG. 11C, a pictorial representation is shown for a hypothetical packet according to a preferred embodiment of the present invention. The first field is a loading dock address field 346 of four (4) bits. The next field is the eight (8) bit field 348 defining the number of nibbles of data shipped by the previously noted loading dock. In FIG. 11C, fields 346 and 348 are repeated; in this example, only two loading docks 28 have active data to be shipped. A four (4) bit field 350 follows field 348 defining the termination of the last field 348. Field 350 is followed by sequence and acknowledgement fields 352 and 354 respectively (each two [2] bits). Next in order within packet 334 are two data fields 356, the first has five (5) nibbles of data of four (4) bits each (i.e. twenty (20) bits total from the first loading dock sending data) and the second has six (6) nibbles of data of four (4) bits each (i.e. twenty-four (24) bits total from the second loading dock sending data). A twenty-four (24) bit CRC 358 follows the data fields 356, and, lastly, a 540 bit field 360 fills out the 640 bit packet.

Note that in the arrangement of packet 334 as illustrated in FIGS. 11A, 11B, and 11C, a packet is shipped every other epoch and that partially filled packets *are* shipped. This assures minimum pipe filling delay times, and removes the effects of any errors which would require retransmission had they occurred at the end of the usable data section of the packet. This arrangement simplifies the use of high speed modem 10 when telephone circuit 12 is subject to a number of defective frequency channels. When a frequency channel is rendered unusable by noise or otherwise, a single frequency carrier is dropped consequently reducing the net data rate five (5) bits per epoch or ten (10) bits per packet.

Remote Diagnostics

It is one of the significant advantages of high speed modem 10 of the present invention to be able to completely characterize the telephone channel to a degree hitherto practicably impossible and to effectively correct each of the multiplicity of impairments so measured. This information is generated within constellator 20, particularly by means of the phase subtractor signal 274 and the amplitude subtractor signal 278. This information may be readily accessed by means of the concept of the virtual loading docks 28 described hereinabove. Virtual loading dock 302 (LD0) has the capability to send packets to its remote corresponding loading dock 302' (LD0') in order to exchange performance data of one modem 10 relative to another modem 10'.

Thus each modem 10 (or 10') of the present invention can exchange a complete set of measurements with another similar modem. For *each* of the frequencies used a carriers, individual measurements exist defining amplitude, phase delay, noise, and frequency offset. This arrangement is both useful to exchange performance information between sending and receiving modems *and* with a remote third modem. For this purpose, an independent diagnostic channel (not shown in the drawing figures) can be used. This independent diagnostic channel comprises a separate telephone circuit and may use a conventinal 300 bps frequency shift modem of the prior art such as an AT&T 103A. The AT&T 103A class of modem employs autoanswer and audodial wherein an incoming call from a remote diagnostic center can be connected to read out the packets from the virtual loading dock shipping diagnostic data. Since a dial up connection exists during the period that diagnostic information is being exchanged, the same extra telephone circuit may be shared and also used as a voice communication circuit in order to aid in servicing the telephone line or modem 10 of the present invention. Note that the use of such an optional diagnostic telephone circuit in no way is required to achive the basic objective of full duplex operation at data rates in excess of 9600 bps over a two wire dial up telephone circuit; it is nonetheless an attractive advantage of the high speed modem 10 of the present invention.

While for the sake of clarity and ease of description, a specific embodiment of the present invention has been described hereinabove, the scope of the present invention is intended to be measured by the claims as set forth hereafter. It is clear that those skilled in the art to which the present invention applies will be able to practice the present invention with variations in structure from the preferred embodiment including the use of one or more microprocessors to implement the logical processes described herein. All such equivalent variations within the scope of the following claims are intended to be part of the present invention.

What I claim is:

1. A modem for transmitting source information and for receiving destination information in packetized format by means of an ensemble of frequencies through a communication medium having a passband comprising:
   a transmit modulator means adapted to impress signals containing said source information upon said communication medium and constructed from
   means for generating a plurality of first digital values directly representative of an ensemble of carriers whose frequencies are within said passband,
   means for generating second digital values from said first digital values directly representative of modulating said carriers with first unencoded orthogonal signals and encoding said carriers with said information in the form of discrete amplitude and phase deviations, said deviations defining digital data in packets upon said selected ones of said carriers,
   means for accurately controlling the duration of said modulating of said carriers for discrete epoch periods,
   means for converting said second digital values into analog signals for impression of said analog signals upon said communication medium as modulated carriers at said frequencies of said ensemble of carriers;
   a receive demodulator means adapted to extract said destination information from signals impressed upon said communication medium and constructed from
   means for generating a plurality of third digital values directly representative of analog signals received through said communication medium, said third digital values being developed by multiplying signals representative of said modulated carriers impressed upon said communication medium by a plurality of signals representative of second orthogonal signals of known amplitude and phase,
   means for integrating said third digital values precisely over time to determine frequency and phase of unencoded orthogonal signals substantially idential to said first orthogonal signals and generating therefrom said second orthogonal signals,
   means for comparing said third digital signals with fourth digital signals, said fourth digital signals representative of patterns of possible encoded data conveyed by said selected ones of said carriers to decode said destination information, and
   means for detecting packets of said data which have been corrupted in transmission; and
   means for measuring the transmission characteristics of said communication medium for each of said transmitted carriers constructed from
   means for transmitting selected ones of said carriers at a predetermined amplitude level and for a predetermined period,
   means for analyzing signal corruption caused by communication medium impairments to received carriers carrying said destination information by comparing received data patterns with known good data patterns, and
   means for avoiding use of at least a selected one of said carriers for transmission of data in the event said analyzing means indicates said selected one of said carriers is subject to impairments to said communication medium affecting transmission of data.

2. The packetized ensemble modem of claim 1, wherein said communication medium is a bandlimited telephone line subject to amplitude and phase distortion.

3. The packetized ensemble modem of claim 2, wherein said first unencoded orothogonal signals are a pair of sinusoids that are 90 degrees out of phase.

4. The packetized ensemble modem of claim 1, further comprising:
means for correcting amplitude and phase distortion for each of the received carriers with respect to a reference carrier wherein said reference carrier is one of the plurality of discrete transmitted carriers.

5. The packetized ensemble modem of claim 1 wherein
said carriers are divided into a first group of carriers forming a high speed channel and a second group of carriers forming a low speed reverse channel.

6. The packetized ensemble modem of claim 5 wherein a plurality of input data signals from a plurality of data input sources are multiplexed over a plurality of epoch periods to form error-protected individual units of source information.

7. The packetized ensemble modem of claim 6, wherein
said first group of carriers forming a high speed channel comprises sixty-four (64) carriers,
said second group of carriers forming a low speed reverse channel comprises nine (9) carriers, and
said error-protected data packets each consists of five (5) bits of encoded data per epoch period on each carrier.

8. The packetized ensemble modem of claim 4, further comprising:
means for measuring the phase, amplitude, and noise characteristics of the transmitted carriers corrupted by a first communication medium as received by said receive demodulator,
means for statistically averaging said measured phase, amplitude, and noise characteristics for each of said transmitted carriers over a plurality of epoch periods, and
means for packetizing information constituting said statistically averaged phase, amplitude, and noise characteristics for each of said transmitted carriers and transmitting said packetized information to a remote site over a second communication medium for diagnostic purposes.

9. The packetized ensemble modem of claim 8, wherein
said first communication medium is utilized for the transmission of error-protected data packets, and
said second communication medium is utilized for the transmission of said statistically averaged diagnostic information and voice traffic.

10. In a modem utilized for transmitting source digital information and for receiving destination digital information over a communication medium utilizing a plurality of carriers located within the passband of the communication medium, the improvement comprising:
means for measuring the transmission characteristics of said communication medium constructed from
means for transmitting said source digital information on selected ones of said carriers at a predetermined amplitude level and for a predetermined period,
means for analyzing signal corruption caused by communication medium impairments to received carriers carrying said destination digital information by comparing received data patterns with known good data patterns, and
means for avoiding use of at least a selected one of said carriers for transmission of said source digital information in the event said analyzing means indicates said one of said carriers is subject to impairments to said communication medium affecting transmission of data.

* * * * *